United States Patent
Yang et al.

(10) Patent No.: US 6,404,521 B1
(45) Date of Patent: Jun. 11, 2002

(54) FILTERS TO ADJUST DWDM TRANSMISSIVITY

(75) Inventors: Yawen Yang, Newark; Wenyong Zhu, Fremont; Tzong-Shinn Jiang, San Jose, all of CA (US)

(73) Assignee: Tera Fiberoptics, Inc., Fremont, CA (US)

( * ) Notice: Subject to any disclaimer, the term of this patent is extended or adjusted under 35 U.S.C. 154(b) by 44 days.

(21) Appl. No.: 09/679,895

(22) Filed: Oct. 5, 2000

(51) Int. Cl.$^7$ .......................... H04J 14/00; H04J 14/02; H04B 10/20; G02B 6/28
(52) U.S. Cl. .................. 359/115; 359/118; 359/124; 359/127; 385/24; 385/15
(58) Field of Search .................. 385/15, 24, 31, 385/39, 42, 50; 359/115, 118, 124, 127, 128, 130

(56) References Cited

U.S. PATENT DOCUMENTS

| | | | | |
|---|---|---|---|---|
| 5,852,505 A | * | 12/1998 | Li | 359/118 |
| 6,141,130 A | * | 10/2000 | Ip | 359/179 |
| 6,160,932 A | * | 12/2000 | Huang et al. | 385/24 |
| 6,256,433 B1 | * | 7/2001 | Luo et al. | 385/24 |
| 2001/0024543 A1 | * | 9/2001 | Ahmadvand et al. | 385/24 |

* cited by examiner

Primary Examiner—Brian Healy
Assistant Examiner—Kevin S Wood
(74) Attorney, Agent, or Firm—John Schipper

(57) ABSTRACT

System and method for wavelength discrimination using a DWDM (N+1)-stage fiber optic cascade tree structure with additional filtering to provide acceptable flat-top passband response, and to provide acceptable optical isolation when combined with a multilayer thin film filter. Each channel in a DWDM cascade tree structure has a conventional Mach-Zehnder interferometer (MZI) that provides wavelength discrimination. Each channel in at least one stage has an additional filter that is either (1) an inverted Fabry-Perot etalon (FPE) or (2) an inverted, non-symmetric MZI. The number of output channels may be 32, 64, 128 or more.

24 Claims, 7 Drawing Sheets

FILTERS TO ADJUST DWDM TRANSMISSIVITY

FIELD OF THE INVENTION

This invention relates to Dense Wavelength Division Multiplexer (DWDM) devices, and more particularly to DWDM cascade tree structures that provide specified flat-top passband response and optical isolation.

BACKGROUND OF THE INVENTION

A DWDM device can be used to increase the number of communication channels available in a fiber optical system. Today, researchers are studying a few competing technologies. One mature technology, relying on standard thin film filter coatings, is characterized by high signal insertion losses, low channel counts and relatively high cost, and is generally useful only for DWDM devices with channel spacing greater than 50 GHz.

Another competing technology, involving use of Mach-Zehnder interferometers ("MZIs"), is characterized by low signal insertion loss, low polarization dependent low, relatively low cost, high uniformity and high signal crosstalk and is a more attractive choice for DWDM devices with lower channel spacing. However, standard MZI technology suffers from low isolation between adjacent channels and provides an approximately Gaussian shape for the corresponding transmission curves. These latter two problems make it difficult for a DWDM device relying on standard MZI technology to comply with DWDM standards for optical isolation and "flat-top" passband response set down by BellCore. If these two problems can be either solved or reduced in severity, DWDM devices relying on MZI technology could become widely used in voice, data and image communications.

What is needed is a DWDM system having low signal insertion loss, low polarization dependent loss, high uniformity, relatively low signal crosstalk, acceptable channel isolation and acceptably low passband insertion loss. Preferably, the system should have acceptably low cost and should be flexible enough to meet various commercial communication requirements.

Preferably, the system should meet or exceed the BellCore standards for flat-top passband response and for optical isolation.

SUMMARY OF THE INVENTION

These needs are met by the invention, which uses an improved DWDM cascade structure with distributed filtering and MZI technology to provide acceptable channel isolation for relatively low channel spacing and to comply with the BellCore standards for optical isolation and for flat-top passband response within a channel, over a system of $2^N$ output channels for 100 GHz (or higher) channel spacing with N=4, 5, 6, . . .

The basic structure is a bifurcated or cascade tree system with N stages, numbered n=0, 1, 2 . . . , N, with stage number 0 being a light input channel, with stage number n having $2^n$ fiber optical channels in parallel, with each channel in stage n ($1 \leq n \leq N$) having an MZI, defined by two 3 dB couplers and two parallel fiber optic arms of unequal length, at the beginning of the channel, and with each channel except an output channel or port feeding an MZI that is part of stage n+1 (n=1, 2 . . . , N−1). A "stage", as used herein, refers to a group of one or more parallel fiber optic channels, with each channel having an MZI positioned at the beginning of the channel for wavelength discrimination. A typical cascade tree structure of fiber optic channels is disclosed and discussed in U.S. Pat. Nos. 5,809,190 and 5,987,201, issued to P. Z. Chen (FIG. 1 and discussion), incorporated by reference herein. Use of a Fabry-Perot etalon as a filter in a fiber optic channel is disclosed by Colbourne in U.S. Pat. No. 5,666,225, incorporated by reference herein.

Optical isolation complying with the present BellCore standards for specified channel spacings can be approached by careful design and fabrication of the MZIs used in the cascade structure. However, a straightforward approach sharpens the peaks of the transmission factors, as a function of wavelength, so that compliance with the required flat-top passband responses becomes even more difficult.

The invention provides combines the basic structure with either a filter that is either an inverted non-symmetric MZI ("NSMZI") or with an inverted Fabry-Perot etalon ("FPE") having a modest optical finesse ($F \leq 2$) that is incorporated in all channels in a selected stage, preferably stage 0, 1, 2 or 3, where a sequence of transmission minima for the inverted filter coincides with a selected sequence of wavelengths that substantially coincide with the peak wavelengths, in order to facilitate a "flat-top" response that complies with the BellCore standards.

DESCRIPTION OF BEST MODES OF THE INVENTION

Figure 1:
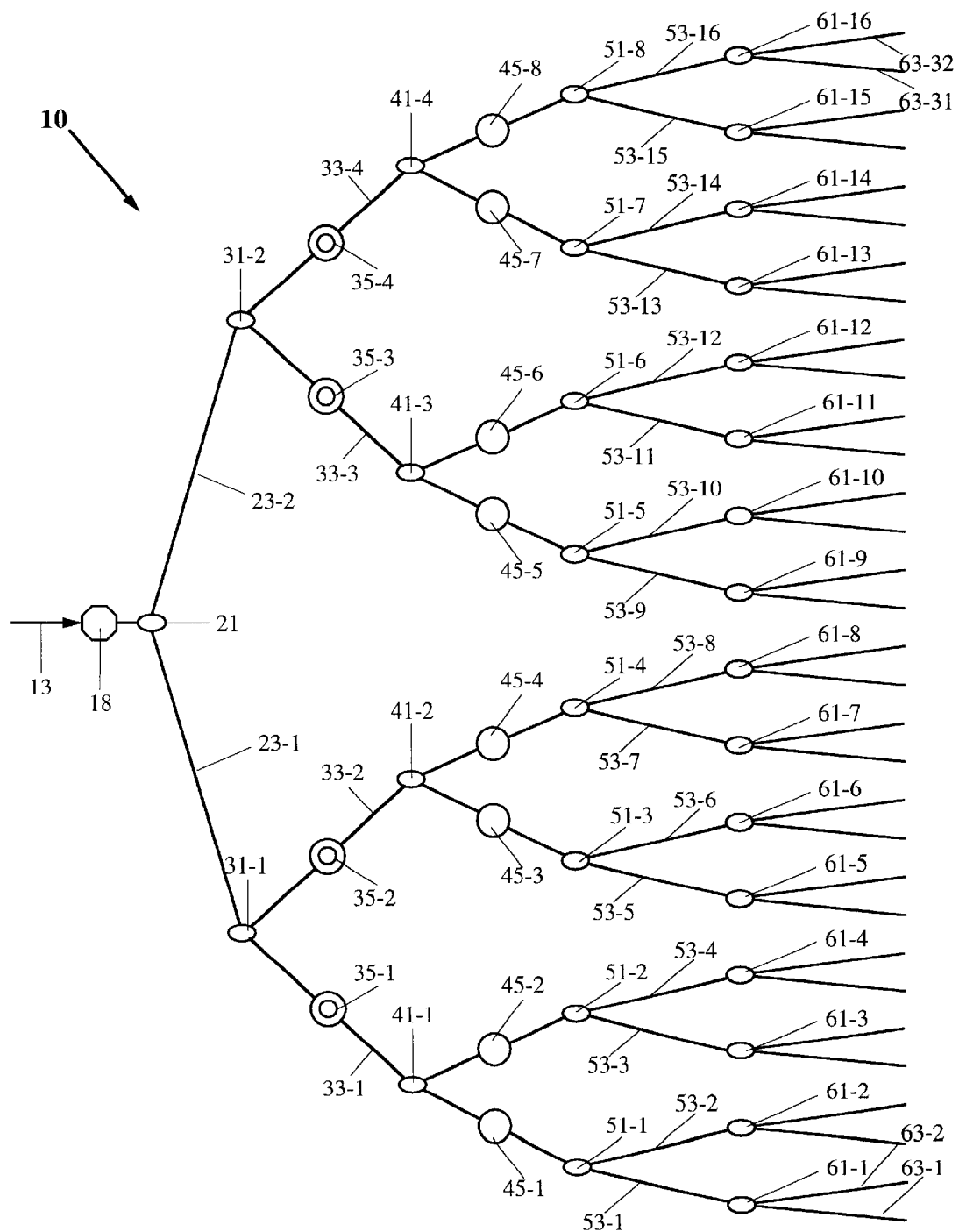
FIG. 1 schematically illustrates a cascade structure for a DWDM device constructed according to the invention.

FIG. 1 illustrates one embodiment 10 of a DWDM cascade tree structure, which preferably includes one or more MZIs in each channel, to discriminate in for or against one or more wavelength components. An MZI is discussed generally by M. Born and E. Wolf in *Principles Of Optics*, Pergamon Press, Oxford, Fifth Edition, 1975, pp. 312–316. Use of a tunable optical filters, such as FPEs etalons and MZIs, in a fiber optic network is discussed in a more relevant manner by G. P. Agrawal in Fiber-Optic Communication Systems, John Wiley & Sons, New York, Second Edition, 1997, pp. 296–303.

In FIG. 1, light having a plurality of wavelengths $\lambda_m$ (m=1, 2, ...) is received on an input channel 13-1 ("stage 0") at an MZI 21 that is part of the first stage of a cascade tree structure. The input light is divided by the wavelength discrimination of the MZI, as discussed in the following, into a first group of wavelengths and a second group of wavelengths with substantially no overlap. Light having the first group and second group of wavelengths proceeds along the channels 23-1 and 23-2 of the first stage and is received by the respective MZIs 31-1 and 31-2 that are part of a second stage. Light arriving at each of the MZIs 31-1 and 31-2 is again divided into a first group and a second group of wavelengths with substantially no overlap, by wavelength discrimination at the MZIs, and proceeds along one of the channels 33-1, 33-2, 33-3 and 33-4 that are part of the second stage. Light is received from the channels 33-1, 33-2, 33-3 and 33-4 at the respective MZIs 41-1, 41-2, 41-3 and 41-4 that are part of a third stage; and light is divided into a first group and a second group of wavelengths with substantially no overlap, by wavelength discrimination at the MZIs, and proceeds along one of the channels 43-1, 43-2, 43-3, 43-4, 43-5, 43-6, 43-7 and 43-8 that are part of the third stage.

Light is received from each of the channels 43-1, 43-2, 43-3, 43-4, 43-5, 43-6, 43-7 and 43-8 at the respective MZIs 51-1, 51-2, 51-3, 51-4, 51-5, 51-6, 51-7 and 51-8 that are part of a fourth stage, and is again divided into a first group and a second group of nonoverlapping wavelength sub-bands. These sub-bands of light proceed along the channels 53-q (q=1, 2, ..., 16) and are received at the respective MZIs 61-q (q=1, 2, ... 16) that are part of a fifth stage.

Light is again divided at each of the MZIs 61-q into a first group and a second group of nonoverlapping wavelength sub-bands that proceed along the channels 63-p (p=1, 2, ..., 32). At the fifth stage and any subsequent stages, according to one embodiment of the invention, the wavelength discriminators are again conventional MZIs. This cascade tree structure is continued for N+1 stages, with N=5 ($2^5$ output channels), N=6 ($2^6$ output channels), or another selected integer.

A selected filter mechanism is incorporated in all channels of at least one stage, preferably including one or more of stages 0, 1, 2 and 3. Different selected filters may be used in different stages.

Figure 2:
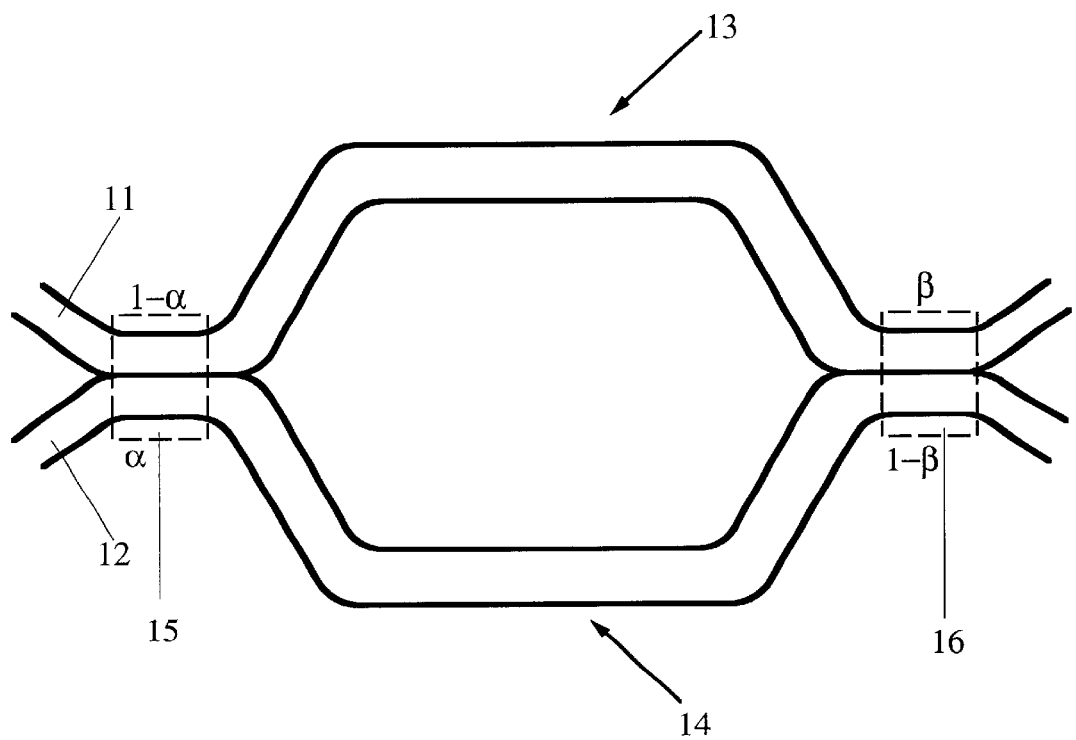
FIG. 2 illustrates a configuration for an MZI used in the invention.

A first embodiment of the filter mechanism is a non-symmetric version of a conventional (symmetric) MZI. As illustrated in FIG. 2, a conventional (symmetric) MZI has two fibers, 11 and 12, with the respective corresponding arms, 13 and 14, of unequal lengths, L1 and L2, respectively. Each arm, 13 and 14, is defined by first and second 3 dB optical fiber couplers, 15 and 16, spaced apart and arranged serially, with symmetric coupling coefficients $\alpha=\beta=0.5$. The initial part of each arm, 13 and 14, immediately following a first fiber coupler 15, carries a portion of a single light beam. However, because of the length difference, or equivalent time delay $$\tau=(L2-L1)/c(\neq 0) \tag{1}$$

interference occurs at the second fiber coupler 16, resulting in transmission of light beyond the second fiber coupler with a transmissivity factor of $$T_{11}(f\tau)=\{1+\cos(2\pi f\tau)\}/2=\cos^2(\pi f\tau), \tag{2}$$

$$T_{12}(f\tau)=\{1-\cos(2\pi f\tau)\}/2=\sin^2(\pi f\tau), \tag{3}$$

$$f=c/\eta\lambda, \tag{4}$$

where f is the frequency corresponding to a wavelength $\lambda$ included in the incident light and $\eta$ is the optical fiber refractive index. For frequencies near $$f=f1(\text{pass})=m/\tau (m=1, 2, 3, ...), \tag{5}$$

light having the corresponding wavelength component is passed by the second fiber coupler 16 and appears in the first fiber 11 with little or no loss transmissivity loss. For frequencies near $$f=f1(\text{exting})=(m+0.5)/\tau (m=0, 1, 2, 3, ...), \tag{6}$$

light having the corresponding wavelength component is extinguished (almost) completely in the first fiber 11 beyond the second fiber coupler 16. The full width at half maximum (FWHM) for the overall filtering action in the first fiber 11 is $$\Delta f=FWHM=1/2\tau. \tag{7}$$

$$\Delta1=2c/\eta\lambda. \tag{8}$$

The situation in the second fiber 12, beyond the second fiber coupler 16, is reversed. Light having frequencies near $$f=f2(\text{pass})=(m+0.5)/\tau (m=0, 1, 2, 3, ...), \tag{9}$$

appears in the second fiber 12 with little or no transmissivity loss, and light having frequencies near $$f=f2(\text{exting})=m/\tau (i\ m=1, 2, 3, ...), \tag{10}$$

is (almost) completely extinguished in the second fiber.

Each conventional MZI includes first and second spaced apart 3 dB fiber couplers, 15 and 16, has different fiber lengths between the two couplers, and serves as a wavelength discriminator. Beyond the second coupler 16, a first fiber 11 passes (only) light having wavelengths near a first selected set of wavelengths, a second fiber 12 passes (only) light having wavelengths near a second selected set of wavelengths. The first and second selected sets of wavelengths are mutually exclusive. Thus, if an MZI is placed at the beginning of a stage, and receives light from a fiber optic channel, the two output fibers for the MZI will each carry light having substantially different selected sets of wavelength components.

Where the MZI coupling coefficients $\alpha$ and $\beta$ in FIG. 2 are independently chosen and satisfy $\alpha\neq 0.5$ and/or $\beta\neq 0.5$, the MZI is referred to as "non-symmetric". A transfer matrix analysis, employing the Jones-Mueller formalism, is used to analyze the electromagnetic components of a non-symmetric MZI. For the configuration shown in FIG. 2, the transfer matrix is a product of (1) a first coupling matrix ($\alpha$) for the first coupler, (2) light propagation and phase shift over the two arms having different lengths, L1 and L2, and (3) a second coupling matrix ($\beta$) for the second coupler. Complex electromagnetic vectors E1, having a magnitude |E1|=1, and E2, having a magnitude of 0, are received in the fibers, 11 and 12, respectively, and pass through the first coupler 15, along the two arms, 13 and 14, through the second coupler 16, and pass beyond the second coupler as vectors E3 and E4 in the respective fibers 11 and 12. A general transfer matrix for this procedure may be expressed as $$\begin{bmatrix} \sqrt{(1-\beta)} & -\iota\sqrt{(\beta)} \\ -\iota\sqrt{(\beta)} & \sqrt{(1-\beta)} \end{bmatrix} \begin{bmatrix} \exp(\iota kL1) & 0 \\ 0 & \exp(-\iota kL2) \end{bmatrix} \begin{bmatrix} \sqrt{(1-\alpha)} & -\iota\sqrt{(\alpha)} \\ -\iota\sqrt{(\alpha)} & \sqrt{(1-\alpha)} \end{bmatrix} \begin{bmatrix} E1 \\ E2 \end{bmatrix} = \begin{bmatrix} E3 \\ E4 \end{bmatrix} \quad (11)$$

$$k(L2-L1)=2\pi(c(c/\eta\lambda)(L2-L1)/c=2\eta f\tau. \quad (12)$$

For the configuration discussed in the preceding, with E1=1 and E2=0, the transmissivity factors becomes $$T_{11}(f\tau)=|E3|^2/|E1|^2=\alpha\cdot\beta+(1-\alpha)\cdot(1-\beta)+2\sqrt{\{(1-\alpha)\cdot(1-\beta)\cdot\alpha\cdot\beta\}}\cos(2\pi f\tau), \quad (13)$$

$$T_{12}(f\tau)=|E4|^2/|E1|^2=\alpha\cdot(1-\beta)+(1-\alpha)\cdot\beta-2\sqrt{\{(1-\alpha)\cdot(1-\beta)\cdot\alpha\cdot\beta\}}\cos(2\pi f\tau), \quad (13)$$

and one verifies that $T_{11}(f\tau)+T_{12}(f\tau)=1$ as required for a lossless system.

For this non-symmetric MZI, each of the transmissivity factors $T_{11}(f\tau)$ and $T_{12}(f\tau)$ has a sequence of minimum values and a sequence of maximum values, $$T_{11},\max=\alpha\cdot\beta+(1-\alpha)\cdot(1-\beta)-2\sqrt{\{(1-\alpha)\cdot(1-\beta)\cdot\alpha\cdot\beta\}}, \quad (15)$$

$$T_{11},\min=\alpha\cdot\beta+(1-\alpha)\cdot(1-\beta)+2\sqrt{\{(1-\alpha)\cdot(1-\beta)\cdot\alpha\cdot\beta\}}, \quad (16)$$

each satisfying $0<T_{11},\min<T_{11},\max<1$, as long as $\alpha\neq0.5$ and/or $\beta\neq0.5$. Thus, light having a given wavelength component is never completely extinguished or discriminated against. Where the second type of filter is to be used in the cascade structure 10 in FIG. 1, the parameters, $\alpha$, $\beta$ and $\tau$, of the non-symmetric MZI are chosen so that wavelengths corresponding to the minimum values of the transmissivity factor $T_{11}(f\tau)$ or $T_{12}(f\tau)$ coincide with a specified periodic sequence of wavelengths. As noted in the preceding, this coincidence of transmissivity minima facilitates compliance with the BellCore flat-top passband standards.

Where a non-symmetric MZI filter is to be used in the cascade structure 10 in FIG. 1 (for example, at the position 18 in FIG. 1), the parameters, $\alpha$, $\beta$ and $\tau$, of the non-symmetric MZI are chosen so that wavelengths corresponding to the minimum values of the transmissivity factor $T_{11}(f\tau)$ or $T_{12}(f\tau)$ coincide with a specified periodic sequence of wavelengths corresponding to the peak wavelengths, in order to suppress each peak in a central region. This coincidence of transmissivity minima facilitates compliance with the BellCore flat-top standards. This first type of filter is used in all channels of one or more selected stages of the cascade structure shown in FIG. 1.

Figure 3:
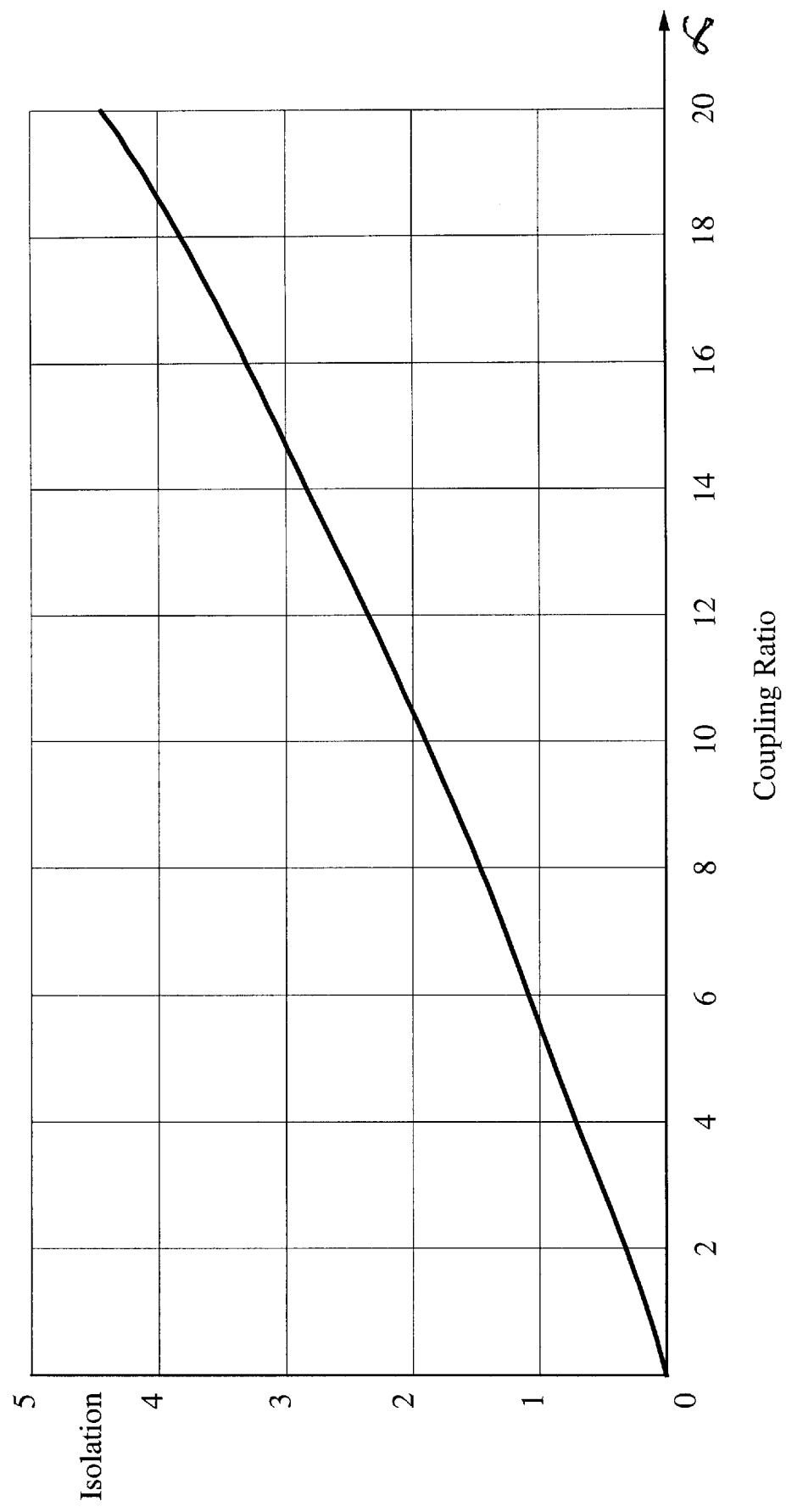
FIG. 3 graphically illustrates optical isolation for a "bare" non-symmetric MZI, as a function of coupling coefficient.

FIG. 3 is a graphical view of optical isolation in dB for a single stage including a "bare" non-symmetric MZI, as a function of coupling coefficient $\alpha$ with $\alpha=1-\beta$, for values $0\leq\alpha\leq0.2$. The curve is slightly convex and almost linear as $\alpha$ varies.

Figure 4:
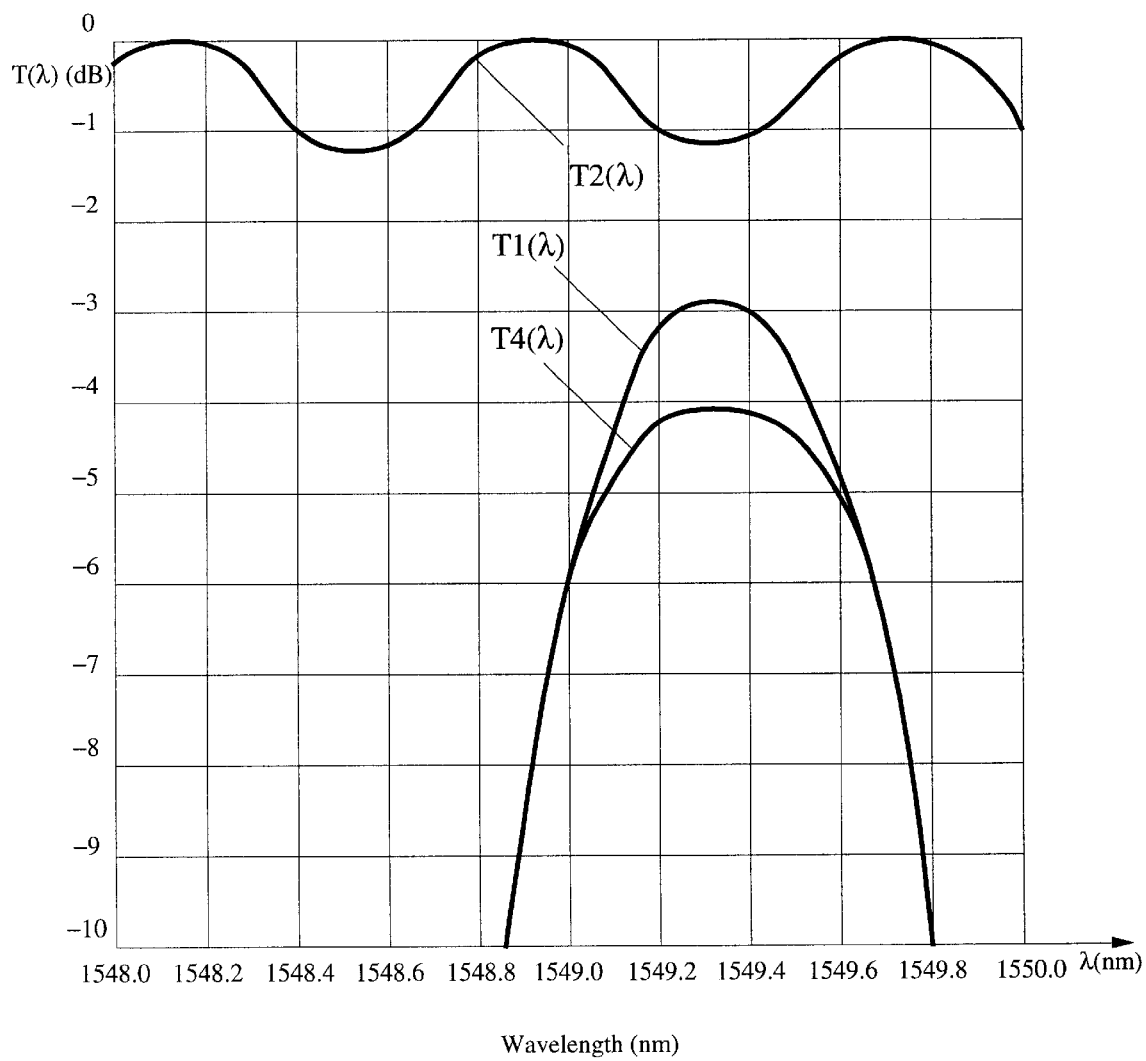
FIG. 4 graphically illustrates transmissivity for a "bare" non-symmetric inverted MZI ("NSMZI"), for a conventional MZI cascade structure combined with a thin film filter ("TFF"), and for a combination of these two structures, as a function of wavelength.

FIG. 4 is a graphical view of non-normalized transmissivity, as a function of wavelength, of an output channel for five stages of a conventional MZI cascade tree structure combined with a thin film filter ("TFF") on each output channel (T1($\lambda$)), and for a "bare" non-symmetric MZI (T2($\lambda$)), respectively. FIG. 4 also shows the non-normalized transmissivity T4($\lambda$), where these two structures are combined in a cascade tree structure. Note the pronounced flat-top passband response manifested by the transmissivity curve T4($\lambda$). The transmissivity curve T2($\lambda$) in FIG. 4 corresponds to the parameter choices $\alpha=1-\beta=0.07$, L2–L1=$2\times10^3$ $\mu$m FSR=0.8 nm.

More generally, a suitable range for the coupling coefficients is $\alpha=1-\beta=0.05-0.10$; and more preferably $\alpha=1-\beta=0.07-0.08$.

A second embodiment of the filter is an "inverted" Fabry-Perot etalon ("FPE") having a relatively low optical finesse $F=\pi\sqrt{(R)}/(1-R)(F\leq2)$. Analysis of an FPE is set forth in A. Yariv, *Optical Electronics*, Holt, Rinehart and Winston, New York, Third Edition, 1985, pp. 87–95.

Figure 5:
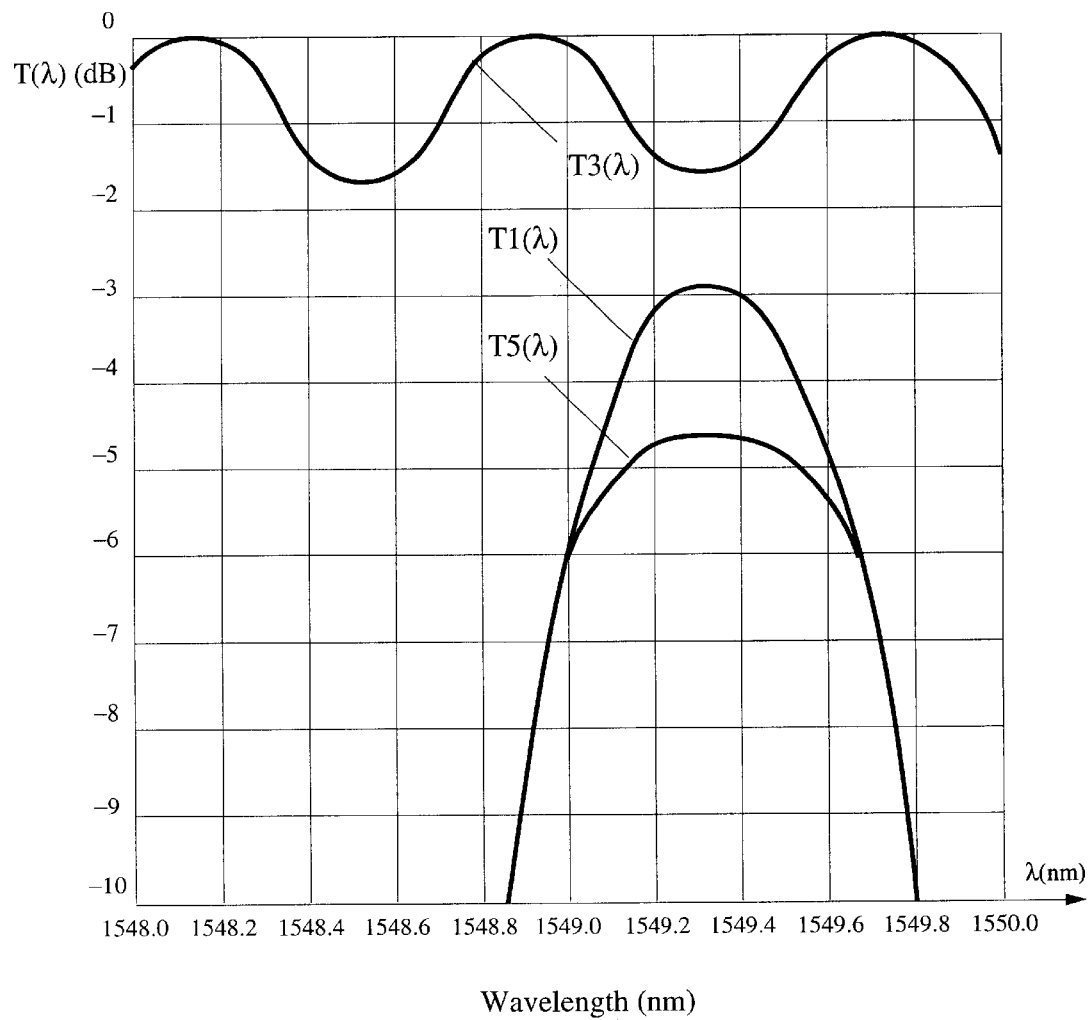
FIG. 5 graphically illustrates transmissivity for a "bare" inverted FPE, for a conventional MZI cascade structure combined with a TFF, and for a combination of these two structures, as a function of wavelength.

FIG. 5 is a graphical view of non-normalized transmissivity, as a function of wavelength, of an output channel for five stages of a conventional MZI conventional cascade tree structure combined with a TFF on each output channel (T1($\lambda$)), and for a "bare" inverted FPE (T3($\lambda$)), respectively. FIG. 5 also shows the non-normalized transmissivity T5($\lambda$), where these two structures are combined in a cascade tree structure. Again, note the pronounced flat-top passband response manifested by the transmissivity curve T5($\lambda$).

The transmissivity curve T3($\lambda$) in FIG. 5 corresponds to the parameter choices d=reflector separation=$1.5\times10^3$ $\mu$m, $\theta$=angle of incidence=0–2°, $\eta$=refractive index of separator=1, R=mirror reflectivity=0.10, and provides an optical finesse F(18)=1.1. The finesse of an FPE is defined as $$F=\pi\sqrt{(R)}/(b\ 1-R), \quad (17)$$

and the corresponding FPE transmission is $$T(\lambda)=\{1+4\cdot F^2\cdot\sin^2(2\pi\eta d\cdot\cos\theta/\lambda)/\pi^2\}^{-1}. \quad (18)$$

With a choice of mirror reflectivity, R1=0.07, the optical finesse is reduced to F(18)=0.9; and with a choice of mirror reflectivity, R1=0.24, the optical finesse is increased to F(18)=2. Optical insertion loss increases with reflectivity or finesse so that a relatively small finesse value may be preferable here.

The FPE 18 may be replaced by an MZI filter 18' having a time delay parameter $\tau$ that is selected (1) to provide a sequence of transmission minima corresponding to a selected sequence of wavelengths and (2) to provide modest optical isolation by itself (corresponding to the relatively low value of finesse, F(18)$\leq$2, for the FPE 18).

Figure 6:
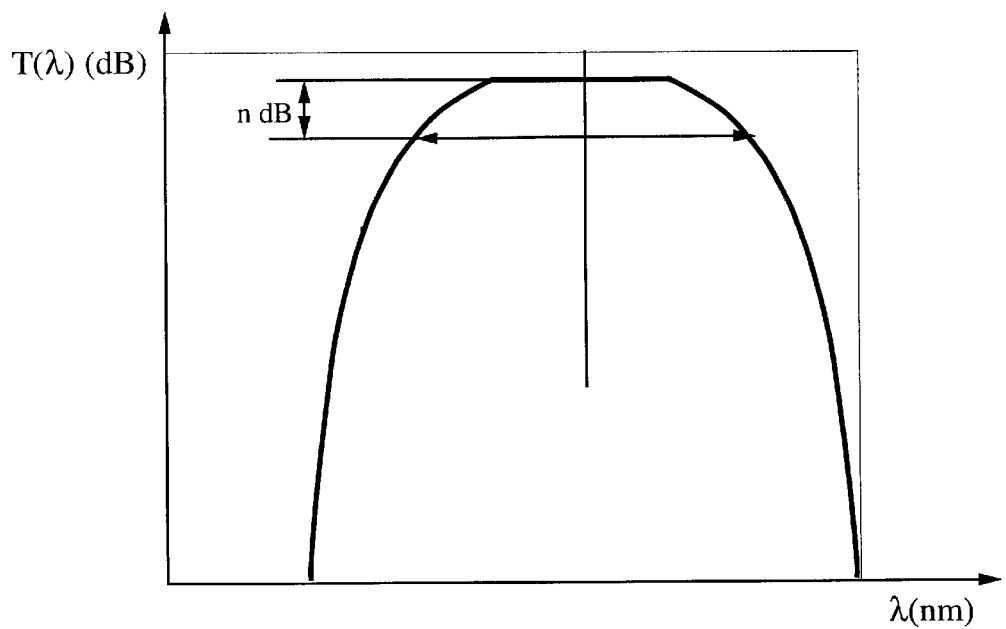
FIG. 6 illustrates the flat-top transmissivity required by the BellCore standards.

FIG. 6 illustrates the flat-top passband response required by the BellCore standards. The BellCore flat-top response standards for certain individual decrements are set forth in Table 1.

TABLE 1

BellCore Transmissivity Standards

| Decrement | Bandwidth Requirement |
|---|---|
| −1 dB | ≧0.35 times channel spacing |
| −3 dB | ≧0.50 times channel spacing |
| −20 dB | ≦1.5 times channel spacing |
| −30 dB | ≦2.2 times channel spacing |

The required channel spacings are 0.8 nm, 1.6 nm, 3.2 nm, 6.4 nm and 12.8 nm.

Figure 7:
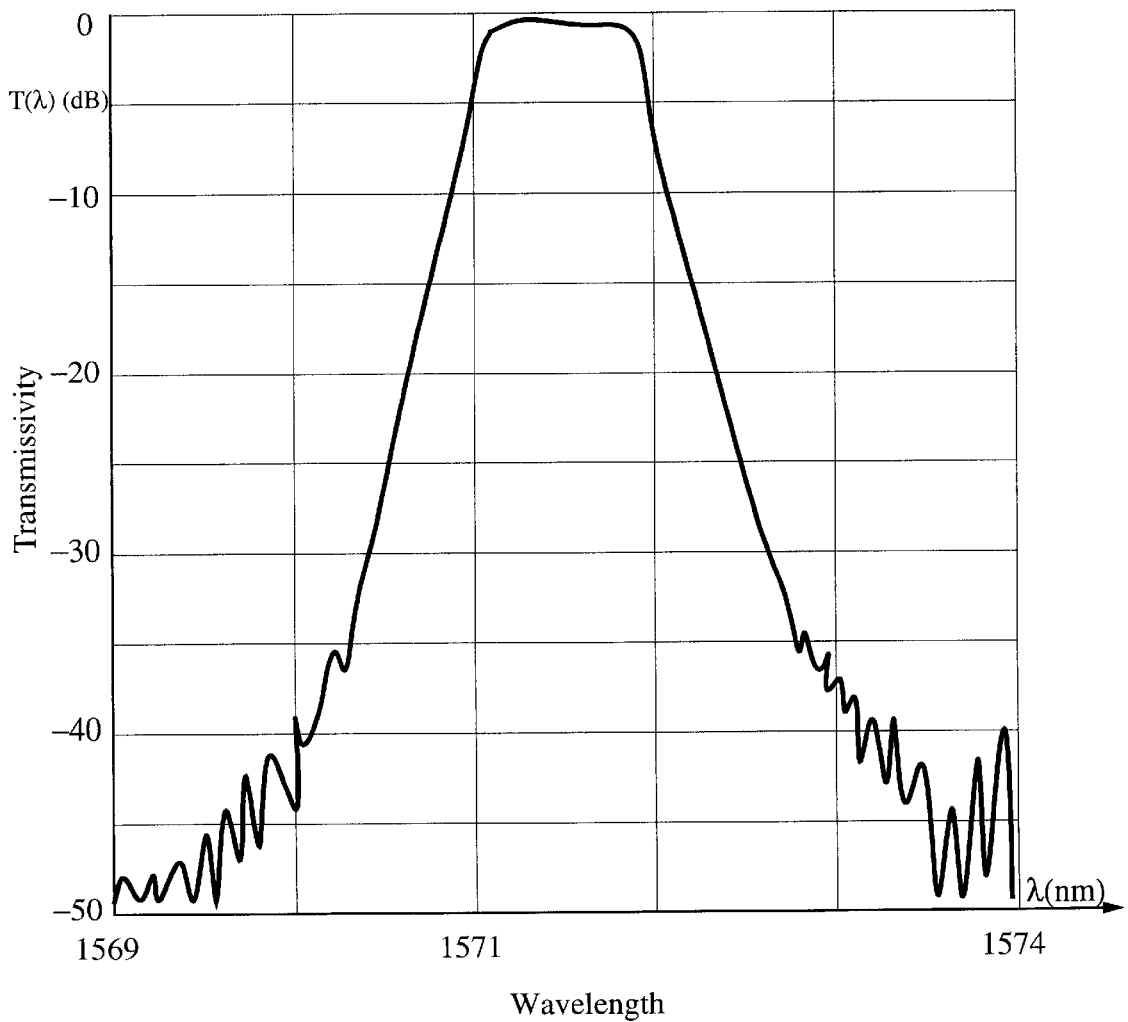
FIG. 7 graphically illustrates transmissivity for a multi-layer thin film filter that is available commercially.

Optical isolation and flat-top passband response for the cascade tree structure, with inverted FPEs or with, inverted non-symmetric MZIs included in one stage, can be enhanced by incorporating a thin film filter ("TFF") having a wavelength pass band that overlaps with a desired wavelength pass band of the output port of a selected stage of channels (e.g., stage N). For example, incorporation of a 4 cavity BPF DWDM band pass filter, available from Optical Coatings of Japan Co., will by itself provide an optical transmissivity factor shown in FIG. 7. Combining this TFF with a cascade tree structure that incorporates an inverted FPE or an inverted, non-symmetric MZI can provide total transmissivity that meets or exceeds the BellCore standards for DWDM devices.

Figure 8:
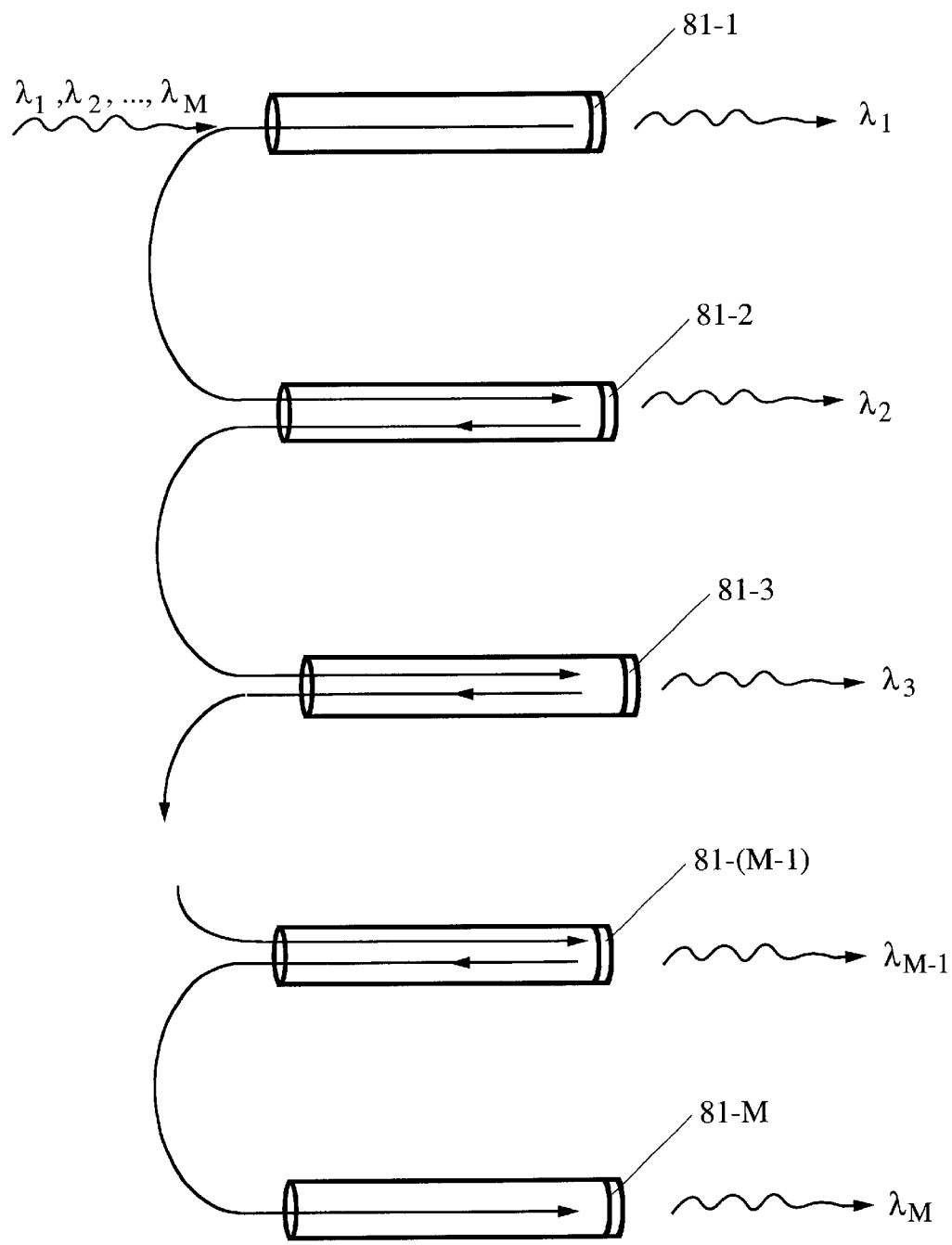
FIG. 8 illustrates an in-line structure relying on TFFs for wavelength discrimination.

Use of optical fibers with a group of M in-line conventional TFF light reflectors, each using a specially designed TFF, as illustrated in FIG. 8, can also be used to provide a sequence of substantially nonoverlapping wavelength components of light, one issuing from each of the TFFs. Light is received by a TFF 81-i (i=1, 2, ..., M−1); light with a selected wavelength component $\lambda_i$ is passed through this TFF, and the remainder of the light not passed by this TFF is reflected and delivered to the next TFF 81-(i+1). Light is received and processed by each of the M TFFs 81-i (e.g., with M=31), rather than by each of 5 stages of a cascade tree structure. An in-line structure, as shown in FIG. 8, relies upon reflection of unwanted wavelength components, rather than upon transmission of a wavelength component resulting from interference of two light beams. The quality control requirements, and therefore the cost, for TFFs in an in-line structure are likely to be higher than the corresponding requirements for TFFs in a cascade tree structure.

What is claimed is:

1. A system for processing light, the system comprising:
   an (N+1)-stage fiber optic cascade structure, numbered n=0, 1, 2, ..., N with N≧5, with stage 0 being a light input stage, with stage number n' (1≦n'≦N) including a symmetric Mach-Zehnder interferometer, referred to as a symmetric "MZI", and $2^{n}$ fiber optic channels, and with each channel in each stage n" being connected to two channels in stage n"+1 (n"=1, 2, ..., N−1) through an MZI; and
   a filter array, positioned in a selected stage n1 and including $2^{n1}$ selected Fabry-Perot etalons, referred to as "FPEs," with each FPE in stage n1 having an associated optical finesse F no larger than 2, having transmission minima at a selected sequence of wavelengths, and being positioned in one of the $2^{n1}$ channels of stage n1, where n1 lies in the range 0≦n1≦N1, with N1≦N.

2. The system of claim 1, wherein N=5 and said system provides a wavelength spacing between at least two of said channels in said stage N of about 100 GHz.

3. The system of claim 1, wherein N=5 and said stage number n1 lies in the range 0≦n1≦3.

4. The system of claim 1, wherein at least one of said stage n1 FPEs is chosen to have a finesse no greater than 1.5.

5. The system of claim 1, wherein at least one of said stage n1 FPEs is chosen to have a finesse no greater than 1.

6. The system of claim 1, wherein at least one of said stage n1 FPEs is chosen to have a free spectral range of about 0.8 nm.

7. The system of claim 1, wherein at least one of said channels in said stage N includes a selected thin film filter having at least one wavelength pass band that overlaps with a wavelength pass band associated with the at least one of said channels in said stage N.

8. A system for processing light, the system comprising:
   an (N+1)-stage fiber optic cascade structure, numbered n=0, 1, 2, ..., N with N≧5, with stage 0 being a light input stage, with stage number n' (1≦n'≦N) including a symmetric Mach-Zehnder interferometer, referred to as a symmetric "MZI", and $2^{n}$ fiber optic channels, and with each channel in each stage n" being connected to two channels in stage n"+1 (n"=1, 2, ..., N−1) through an MZI; and
   a filter array, positioned in a selected stage n1 and including $2^{n1}$ selected non-symmetric MZIs with each non-symmetric MZI in stage n1 having transmission minima at a selected sequence of wavelengths and being positioned in one of the $2^{n1}$ channels of stage n1, where n1 lies in the range 0≦n1≦N1, with N1≦N.

9. The system of claim 8, wherein N=5 and said system provides a wavelength spacing between at least two of said channels in said stage N of about 100 GHz.

10. The system of claim 8, wherein N=5 and said stage number n1 lies in the range 0≦n1≦3.

11. The system of claim 8, wherein at least one of said stage n1 non-symmetric MZIs is chosen to have a free spectral range of about 0.8 nm.

12. The system of claim 8, wherein at least one of said channels in said stage N includes a selected thin film filter having at least one wavelength pass band that overlaps with a wavelength pass band associated with the at least one of said channels in said stage N.

13. A method for processing light, the method comprising:
   providing an (N+1)-stage fiber optic cascade structure, numbered n=0, 1, 2, ..., N with N≧5, with stage 0 being a light input stage, with stage number n (1≦n'≦N) including a symmetric Mach-Zehnder interferometer, referred to as a symmetric "MZI", and $2^{n}$ fiber optic channels, and with each channel in each stage n" being connected to two channels in stage n"+1 (n"=1, 2, ..., N−1) through an MZI; and
   passing light through the N-stage fiber optic cascade structure and through a filter array, positioned in a selected stage n1 and including $2^{n1}$ selected Fabry-Perot etalons, referred to as "FPEs," with each FPE in stage n1 having an associated optical finesse F no larger than 2, having transmission minima at a selected sequence of wavelengths, and being positioned in one of the $2^{n1}$ channels of stage n1, where n1 lies in the range 1≦n1≦N1, with N1≦N.

14. The method of claim 13, further comprising choosing N=5 and providing a wavelength spacing between at least two of said channels in said stage N of about 100 GHz.

15. The method of claim 13, further comprising choosing N=5 and choosing said stage number n1 in the range 0≦n1≦3.

16. The method of claim 13, further comprising choosing at least one of said stage n1 FPEs is chosen to have a finesse no greater than 1.5.

17. The method of claim 13, further comprising choosing at least one of said stage n1 FPEs is chosen to have a finesse no greater than 1.

18. The method of claim 13, further comprising choosing at least one of said stage n1 FPEs is to have a free spectral range of about 0.8 nm.

19. The method of claim 13, further comprising providing at least one of said channels in said stage N with a selected thin film filter having at least one wavelength pass band that overlaps with a wavelength pass band associated with the at least one of said channels in said stage N.

20. A method for processing light, the system comprising:
providing an (N+1)-stage fiber optic cascade structure, numbered n=0, 1, 2, ..., N with N≧5, with stage 0 being a light input stage, with stage number n (1≦n'≦N) including a symmetric Mach-Zehnder interferometer, referred to as a symmetric "MZI", and $2^n$ fiber optic channels, and with each channel in each stage n" being connected to two channels in stage n"+1 (n"=1, 2, ..., N−1) through an MZI; and passing light through the N-stage fiber optic cascade structure and through a filter array, positioned in a selected stage n1 and including $2^{n1}$ selected non-symmetric MZIs with each non-symmetric MZI in stage n1 having transmission minima at a selected sequence of wavelengths and being positioned in one of the $2^{n1}$ channels of stage n1, where n1 lies in the range 1≦n1≦N1, with N1≦N.

21. The method of claim 20, further comprising choosing N=5 and providing a wavelength spacing between at least two of said channels in said stage N of about 100 GHz.

22. The method of claim 20, further comprising choosing N=5 and choosing said stage number n1 in the range 0≦n1≦3.

23. The method of claim 20, further comprising choosing at least one of said stage n1 non-symmetric MZIs to have a free spectral range of about 0.8 nm.

24. The method of claim 20, further comprising providing at least one of said channels in said stage N with a selected thin film filter having at least one wavelength pass band that overlaps with a wavelength pass band associated with the at least one of said channels in said stage N.

* * * * *